United States Patent [19]
Costa et al.

[11] Patent Number: 5,891,976
[45] Date of Patent: *Apr. 6, 1999

[54] CATALYST SYSTEM FOR THE POLYMERIZATION OF OLEFINS, PROCESS FOR THIS POLYMERIZATION AND POLYMERS THUS OBTAINED

[75] Inventors: Jean-Louis Costa, Grimbergen; Sabine Pamart, Mons; Gaëtane Hallot, Brussels, all of Belgium

[73] Assignee: Solvay Polyolefins Europe—Belgium (Sociétété Anonyme), Brussels, Belgium

[ * ] Notice: The term of this patent shall not extend beyond the expiration date of Pat. No. 5,206,198

[21] Appl. No.: 871,767

[22] Filed: Jun. 9, 1997

Related U.S. Application Data

[60] Continuation of Ser. No. 473,972, Jun. 7, 1995, abandoned, which is a division of Ser. No. 056,766, May 4, 1993.

[30] Foreign Application Priority Data

May 4, 1992 [BE] Belgium ............................... 09200412

[51] Int. Cl.$^6$ ........................... C08F 110/06; C08F 10/06
[52] U.S. Cl. ........................... 526/351; 526/153; 526/901
[58] Field of Search ..................... 526/351, 901, 526/153

[56] References Cited

U.S. PATENT DOCUMENTS

| | | | |
|---|---|---|---|
| 3,014,016 | 12/1961 | Natta et al. . | |
| 3,462,403 | 8/1969 | Pendleton . | |
| 4,115,533 | 9/1978 | Yamaguchi et al. . | |
| 4,210,729 | 7/1980 | Hermans et al. . | |
| 4,420,593 | 12/1983 | Sato et al. ............................... | 526/128 |
| 5,206,198 | 4/1993 | Costa et al. ............................. | 502/107 |

FOREIGN PATENT DOCUMENTS

| | | |
|---|---|---|
| 803 875 | 2/1974 | Belgium . |
| 0 114 391 | 8/1984 | European Pat. Off. . |
| 0 145 368 | 6/1985 | European Pat. Off. . |
| 0 202 946 | 11/1986 | European Pat. Off. . |
| 0 238 345 | 9/1987 | European Pat. Off. . |
| 0 424 145 | 4/1991 | European Pat. Off. . |
| 0 485 006 | 5/1992 | European Pat. Off. . |
| 32 20 974 | 4/1983 | Germany . |
| 91/8610 | 10/1991 | South Africa . |
| 1 372 717 | 11/1974 | United Kingdom . |
| 1 557 329 | 12/1979 | United Kingdom . |
| 2 053 246 | 2/1981 | United Kingdom . |
| 0 261 727 | 12/1992 | United Kingdom . |

OTHER PUBLICATIONS

Communications to the Editor, *Macromolecules,* vol. 6, pp. 925–926 (Nov.–Dec. 1973).
Carman et al., Monomer Sequence Distribution in Ethylene Propylene Elastomer. I. Measurement by Carbon–13 Nuclear Magnetic Resonance Spectroscopy, *Rubber Chemistry and Technology,* 44, pp. 781–805 (1974).
Derwent Abstract Accession No. 79–88287B, (1979).
Boor, John Jr., *Ziegler–Natta Catalysts and Polymerizations,* Academic Press, New York, pp. 108–115 (1979).
Billmeyer, Fred W. Jr., *Textbook of Polymer Science, Third Edition,* John Wiley & Sons, New York, pp. 91–96 (1984).
Maiyer et al., "Properties of Polypropylene Synthesized on a Titanium–Magnesium Catalyst", *Polymer Science USSR* vol. 33, No. 5, pp. 924–930 (1991).

*Primary Examiner*—David W. Wu
*Attorney, Agent, or Firm*—Venable; John W. Schneller

[57] ABSTRACT

Catalyst systems comprising, on the one hand, a catalytic solid based on complexed titanium trichloride and, on the other hand, a nonhalogenated organoaluminium activator. When employed in gas phase olefin polymerization processes, these catalyst systems make it possible to manufacture a wide range of homopolymers and copolymers (random and block) with an isotacticity index which can be adjusted to very low values and with excellent pourability, even in the case of copolymers of high comonomer content. In the absence of transfer agents they also make it possible to synthesize polymers of very high molecular masses, with an increased activity. These polymerization processes yield particularly advantageous results in the case of propylene.

13 Claims, No Drawings

CATALYST SYSTEM FOR THE POLYMERIZATION OF OLEFINS, PROCESS FOR THIS POLYMERIZATION AND POLYMERS THUS OBTAINED

This application is a Continuation of application Ser. No. 08/473,972, Filed Jun. 7, 1995, now abandoned which is a division of application Ser. No. 08/056,766 filed May 4, 1993 pending.

The present invention relates to a catalyst system comprising a macroporous $TiCl_3$ catalytic solid and an organoaluminium cocatalyst, and to a gas phase process for the manufacture of olefin polymers employing it. The present invention also extends to the propylene polymers thus obtained and to compositions comprising them and to the shaped articles containing them.

It is known to polymerise alpha-olefins stereospecifically in gaseous phase by means of a catalyst system comprising a solid constituent based on titanium trichloride and an activator based on an organometallic compound. However, because of the nature of the catalyst systems usually employed, the propylene polymers obtained by these processes are generally highly isotactic and therefore fairly rigid, which is not always desirable, especially in packaging applications or those demanding good impact strength.

Thus, in patent BE-A-551,276 (Montecatini & Ziegler), the use of a catalyst system based on $TiCl_3$ together with triethylaluminium (TEAL) results, after gas phase polymerisation, in a highly crystalline polypropylene being obtained.

The morphology of the catalyst employed has a decisive influence on the properties of the polymers obtained. For example, the process described in patent BE-A-773,888 (BASF), which employs another catalyst system based on $TiCl_3$, also in combination with TEAL, can result after gas phase polymerisation in polypropylene exhibiting a lower isotacticity being obtained, but at the cost of a mediocre activity, a heterogeneous morphology of the powders and generally problems of sticking, above all when attempts are made to produce resins of low isotacticity. It is clear that a weak activity results especially in a high content of catalyst residues, and this can rule out some applications demanding resins of high purity.

Furthermore, catalyst systems which have a high porosity in a quite specific range of pore radii have also been proposed (Sumitomo Chemical's patent EP-0,202,946). However, the methods for preparing the catalysts described in this patent are complicated and the most suitable cocatalysts for this process are chlorinated organoaluminium compounds such as diethylaluminium chloride, $Al(C_2H_5)_2Cl$, called DEAC in what follows, and this results in a high chlorine content of the resins.

To sum up, the processes for gas phase polymerisation of propylene which are known so far, and more precisely the catalyst systems which they employ, have many disadvantages when the objective is to obtain propylene polymers of low rigidity, especially:

a weak activity, and hence a high content of catalyst residues;

difficulty in adjusting the isotacticity index down to low values;

difficulty in obtaining resins which have both a low isotacticity and good pourability (problems of sticking);

difficulty in obtaining copolymers incorporating a high proportion of ethylene without also giving rise to problems of sticking;

difficulty in obtaining polymer particles of controllable external morphology (mean diameter, particle size distribution, shape and the like).

Catalyst systems have now been found which no longer give rise to the abovementioned disadvantages when they are employed for the polymerisation of olefins such as propylene.

More particularly, the use of catalyst systems according to the present invention, comprising a catalytic solid based on complexed $TiCl_3$ of a particular type and a particular organoaluminium cocatalyst, in a gas phase process for the manufacture of homopolymers or random or block copolymers of propylene, offers a number of unexpected advantages.

One characteristic of the catalyst systems according to the present invention is their low stereospecificity. This leads to a less stereospecific incorporation of propylene into the polymer chains. A first advantage of the invention is therefore that the minimum isotacticity index which can now be reached is significantly lower than the values obtained with the known catalyst systems. In fact, if the catalyst systems of the present invention are employed, it is possible in particular to obtain propylene homopolymers whose isotacticity index (measured by NMR) can be adjusted from approximately 87% to approximately 60%. It also makes it possible to obtain block copolymers consisting of at least:

a block of weakly isotactic propylene homopolymer (as described below) or of random copolymer containing at least 90% of propylene, and a block of a random propylene-ethylene copolymer which, when good impact strength is aimed at, preferably contains approximately 40 to 60% by weight of ethylene.

The combination of these two types of blocks makes it possible to obtain products which are particularly low in rigidity and which have good impact behaviour.

A second advantage of the catalyst systems according to the invention is that they make it possible to obtain polymer powders of controlled morphology, in this case excellent pourability. This advantage, obtained through the choice of a catalytic solid of appropriate morphology, is particularly sensitive in the case of weakly isotactic homopolymers and in the case of copolymers with a high comonomer content. Thus, block copolymers can be relatively rich (up to 70% by weight) in random copolymer block(s), which generally form an amorphous and sticky product capable of resulting in the blockage of polymerisation reactors, especially in the particular case of propylene-ethylene copolymers in which the proportion of ethylene is approximately 50%.

A third advantage of the invention is that the isotacticity index of the polymers obtained can be varied over a wide range by a very simple adjustment of the operating conditions, namely that of the Al/Ti molar ratio between the cocatalyst and catalyst. Thus, in the case of propylene homopolymers, the isotacticity index may be higher than or equal to approximately 60%, preferably higher than or equal to 65%. Furthermore, this isotacticity index is generally lower than or equal to 87%, preferably lower than or equal to 85%.

A fourth advantage of the catalyst systems according to the invention is that, when used in the absence of transfer agents such as hydrogen, they make it possible to produce polymers of very high molecular masses (called more simply UHMW PP in what follows), this being not only with a very high activity, but also with a very great gain in activity when compared with the cases where transfer agents are present.

A fifth advantage of the catalyst systems according to the invention is that their considerable catalytic activity results in resins containing very few catalyst residues (Ti). Furthermore, the choice of the cocatalyst also decreases the chlorine content of the resins.

A sixth advantage of the invention is that the morphology of the powders produced by starting with catalysts deposited on an inorganic support can be controlled by the choice of this support. This makes it possible to optimise their particle size as well as their fluidisation behaviour in the gas phase process.

Finally, the polymers obtained by processes according to the invention have a greatly reduced enthalpy of fusion (down to approximately 30 J/g in the case of the random copolymers of propylene, and approximately 60 to 80 J/g in the case of propylene homopolymers), which makes them easier to process. In addition, the polymers generally have good transparency, which makes them advantageous in some applications such as packaging.

To this end, a first subject of the present invention relates to catalyst systems which comprise a catalytic solid based on $TiCl_3$ and an organometallic cocatalyst, in which the cocatalyst is a nonhalogenated organoaluminium compound and the catalytic solid is complexed titanium trichloride obtained by heat treatment, in the presence of a halogenated activating agent, of the liquid material resulting from bringing $TiCl_4$, pretreated with an electron-donor compound, into contact with a composition (C) corresponding to the general formula $$AlR_p(Y)_qX_{3-(p+q)} \qquad (I)$$

in which
R denotes a hydrocarbon radical,
Y denotes a group chosen from —OR', —SR' and —NR'R" in which each of R' and R" denotes a hydrocarbon radical or a hydrogen atom,
X denotes a halogen,
p is any number such that 0<p<3 and
q is any number such that 0<q<3, the sum p+q being such that 0<p+q≦3.

In the catalyst systems of the invention, when R, R' and R" denote a hydrocarbon radical, they are generally chosen independently of one another from:
  linear or branched alkyl radicals containing from 1 to 12 carbon atoms, for example methyl, ethyl, n-propyl, isopropyl, n-butyl, isobutyl, n-amyl, isoamyl, n-hexyl, 2-ethylhexyl or n-octyl radicals;
  alkenyl radicals generally containing from 2 to 12 carbon atoms, for example ethenyl, 1-butenyl, 2-butenyl, 2-pentenyl, 1-octenyl or 1-decenyl radicals;
  optionally substituted cycloalkyl radicals generally containing from 5 to 12 carbon atoms, for example cyclopentyl, cyclohexyl, methylcyclohexyl or cyclooctyl radicals;
  optionally substituted aryl radicals generally containing from 6 to 35 carbon atoms, for example phenyl, tolyl, cresyl, xylyl, naphthyl or 2,6-di-tert-butyl-4-methylphenyl radicals;
  arylalkyl radicals generally containing from 7 to 20 carbon atoms, for example the benzyl radical.

In formula (I), X is preferably chlorine, R is preferably chosen from linear or branched alkyl radicals containing from 2 to 8 carbon atoms, Y is preferably chosen from —OR' groups in which R' is an alkyl radical containing from 1 to 12 carbon atoms or an aryl radical containing from 6 to 35 carbon atoms. A particularly preferred radical R is the ethyl radical. Particularly preferred radicals R' are ethyl and amyl radicals.

In formula (I), p is preferably a number such that 1≦p≦2, and q preferably a number such that 0.1≦q≦2, and very particularly such that 0.15≦q≦0.65.

The compositions (C) of formula (I) which are employed for preparing the catalytic solids may be defined chemical compounds or mixtures of compounds. Formula (I) must therefore be considered as an empirical structural formula representing the said compounds or, in the case of mixtures, representing the average composition of the latter.

The compositions (C) can be prepared from organoaluminium compounds (A) of general formula $$AlR_nX_{3-n} \qquad (II)$$

in which R and X have the meanings given above respectively in relation to formula (I), and in which n is any number such that 0<n≦3, preferably such that 1≦n≦3.

By way of examples of compounds (A) there may be mentioned alkylated aluminium compounds such as trialkylaluminiums, dialkylaluminium monohalides and alkylaluminium di- and sesquihalides in which the alkyl radicals are those defined and listed above, as well as their mixtures. Preferred compounds (A) are dialkylaluminium chlorides, very particularly diethylaluminium chloride (DEAC), as well as mixtures of these products with at least one product chosen from monoalkylaluminium dichlorides, trialkylaluminiums and alkylaluminium sesquichlorides.

For the preparation of the composition (C), the compound (A) may be brought into contact with a compound (B) chosen from compounds of formula:

$$—Al(R)_m(Y)_{m'}X_{3-(m+m')} \qquad (III), or$$

$$-YH \qquad (IV),$$

and from the oligomers of aluminoxane type, which are in cyclic and/or linear form, and which can be denoted by the general formulae $$—[Al(R)—O]—_{n'+2} \qquad (V) and$$

$$(R)_2Al—O—[Al(R)—O]_{n'}—Al(R)_2 \qquad (VI)$$

In formulae (III), (IV), (V) and (VI) above, R, Y and X have respectively the meanings given above in relation to formula (I). In formula (III), m is any number such that 0≦m<3, preferably such that 0.5≦m≦1.5, m' is any number such that 0<m'≦3, preferably such that 1≦m'≦2, the sum m+m' being such that 0<m+m'≦3. In formulae (V) and (VI) n' is an integer generally from 2 to 50.

By way of examples of compounds (B) of formula (III) there may be mentioned trialkoxyaluminiums, alkylalkoxyaluminiums, alkoxyaluminium halides and alkylalkoxyaluminium halides, and mixtures thereof. The preferred compounds (B) of formula (III) are alkylalkoxyaluminiums and their chlorides, very particularly diethylethoxyaluminium and ethylethoxy- and ethylisopentoxyaluminium monochlorides. By way of examples of compounds (B) of formula (IV) there may be mentioned alcohols, thioalcohols, phenols, thiophenols and secondary amines, and mixtures thereof. The preferred compounds of formula (IV) are aliphatic alcohols, for example methanol, ethanol, propanol, isopropanol, butanol, isobutanol, pentanol, 3-methyl-1-butanol (isoamyl alcohol), hexanol, 2-ethylhexanol and octanol. Alcohols which are very particularly preferred are ethanol and n- and isoamyl alcohols.

By way of examples of compounds (B) of formulae (V) and (VI) there may be mentioned methyl-, ethyl- and butylaluminoxanes, as well as mixtures thereof.

The compounds (A) and (B) defined above are brought into contact in proportions which are suitable for obtaining a composition (C) corresponding to the formula (I).

A particularly preferred and simple operating method for preparing the composition (C) comprises bringing a compound (A) which is an alkylated aluminium compound into contact with a compound (B) which is an aliphatic alcohol, in a ratio of the aluminium present in the compound (A) to the hydrocarbon radical present in the compound (B) which is always higher than ⅓ and generally lower than 10.

The other general conditions for preparing the composition (C) are not critical. In general, the operation is carried out in liquid phase, for example by mixing the compound (A) and the compound (B) with each other, at least one of them being frequently liquid under normal temperature and pressure conditions. The operation can also be carried out in the presence of an inert hydrocarbon diluent, generally chosen from liquid aliphatic, cycloaliphatic and aromatic hydrocarbons such as liquid alkanes, cycloalkanes or isoalkanes or benzene, and mixtures thereof. In this case the composition (C) is generally present in this diluent in a proportion of 1 to 50% by volume, preferably from 5 to 30% by volume.

The compounds (A) and (B) may be brought into contact at temperatures of approximately 0° to 90° C., preferably approximately of 20° to 50° C., and their mixing may be continued for a sufficient time to permit the completion of any possible chemical reaction, generally from approximately 5 minutes to 100 hours, preferably from 2 to 24 hours.

For the preparation of the catalytic solids, the composition (C) is brought into contact with $TiCl_4$, itself pretreated with an electron-donor compound. This electron-donor compound is generally chosen from organic compounds containing one or several atoms or groups which have one or more pairs of free electrons capable of ensuring coordination with the titanium. These compounds contain from 1 to 30 carbon atoms per electron-donor atom or group.

Among the atoms capable of donating one or a number of pairs of electrons there may be mentioned atoms of the nonmetals of groups V and VI of the Periodic Table, such as, for example, oxygen, sulphur, nitrogen, phosphorus, antimony and arsenic.

Representative examples of compounds containing groups capable of donating one or more pairs of electrons which may be mentioned are ethers, thioethers, thiols, phosphines, stibines, arsines, amines, amides, ketones and esters. The electron-donor compound is preferably chosen from the class of aliphatic ethers, and more particularly from those in which the aliphatic radicals contain from 2 to 8 carbon atoms, preferably 4 to 6 carbon atoms. A typical example of an aliphatic ether which gives very good results is diisoamyl ether. Di-n-butyl ether is also suitable.

The general conditions of the treatment of $TiCl_4$ with the electron-donor compound are not critical, provided that they induce complexing of the $TiCl_4$ with the electron-donor compound. The process generally takes place in liquid phase, the electron-donor compound, optionally dissolved in an inert hydrocarbon diluent as defined above, being added to the $TiCl_4$, itself in pure liquid form or dissolved in such a diluent. When a diluent is used, $TiCl_4$ is generally present therein in a proportion of approximately 1 to 50% by volume, preferably 5 to 30% by volume. The treatment of $TiCl_4$ with the electron-donor compound is performed at a temperature which is generally from approximately 0° C. to the boiling temperature of $TiCl_4$ or of the possible diluent, preferably from 5° to 40° C.

The molar ratio of $TiCl_4$ to the electron-donor compound may vary within wide measures. It is generally from approximately 0.01 mole to 20 moles of $TiCl_4$ per mole of electron-donor compound, preferably from 0.2 to 10 moles per mole, very particularly from 0.3 to 5.

The general conditions for bringing $TiCl_4$, pretreated with the electron-donor compound as described above (called more briefly "pretreated $TiCl_4$" hereinafter), into contact with the composition (C) are not critical either, provided that they result in the formation of a liquid material which is substantially homogeneous and free from solid. In general, the composition (C) in pure liquid form or in diluted form in an inert hydrocarbon diluent as defined above is introduced into the pretreated $TiCl_4$, itself in liquid form or diluted in an inert hydrocarbon diluent, optionally different from the preceding one.

The composition (C) and the pretreated $TiCl_4$ are brought into contact in proportions such that an at least partial reduction of the $TiCl_4$ takes place without substantial accompanying production of solid precipitate. To this end, the quantity of composition (C) brought into contact with the pretreated $TiCl_4$ is such that the atomic ratio of the aluminium present in the composition (C) to the titanium present in the pretreated $TiCl_4$ is generally from approximately 0.05 to 10, preferably from 0.1 to 8. Best results are obtained when this ratio is from 0.2 to 2. The temperature at which the contact between the composition (C) and the pretreated $TiCl_4$ is brought about is generally from approximately 0° to 60° C., preferably from 10° to 40° C.

For the preparation of the catalytic solids, the liquid material obtained as indicated above must be converted into solid particles. To this end, it is subjected to a heat treatment in the presence of a halogenated activating agent.

The general conditions of the heat treatment of the liquid material are not critical, provided that this treatment induces substantial precipitation of solid particles based on titanium trichloride. These conditions are generally also chosen so as to result in substantially spherical particles of uniform particle size and with a mean diameter of approximately 5 to 150 μm, preferably 10 to 100 μm.

To this end, the liquid material is gradually heated from a temperature which is higher than the temperature for bringing the composition (C) into contact with the pretreated $TiCl_4$ to a temperature which does not exceed the boiling point of the liquid material. In general the temperatures between which the liquid material is treated extend from approximately 20° to approximately 150° C., preferably approximately from 80° to 120° C.

The duration of the heat treatment is generally from approximately 5 to 200 minutes, preferably from 30 to 120 minutes. The heat treatment may be performed by raising the temperature of the liquid material continuously or by conforming to one or more plateaus during the temperature rise.

Other details relating to the heat treatment of liquid materials related to those defined above can be found especially in U.S. Pat. No. 4,115,533 (Mitsubishi Chemical Industries), the content of which is incorporated by reference in the present description.

The heat treatment of the liquid material is performed in the presence of a halogenated activating agent. "Halogenated activating agent" is intended to denote any agents whose presence contributes to substantially converting the solid reduced titanium trichloride which is formed during the heat treatment of the liquid material into the violet, delta form of this solid. These agents are generally chosen from inorganic halogen compounds, organic halogen compounds, hydrocarbylaluminium halides, interhalogen compounds and halogens, as well as mixtures thereof. Among these agents there may be mentioned:

as inorganic halogen compounds, metal and nonmetal halides such as, for example, titanium, vanadium, zirconium, aluminium, silicon and boron halides;

as organic halogen compounds, halogenated hydrocarbons such as, for example, halogenated alkanes, carbon tetrahalides and perhaloalkanes;

as hydrocarbylaluminium halides, alkylaluminium dihalides in which the alkyl radical contains from 1 to 8 carbon atoms;

as interhalogen compounds, for example, iodine chloride and bromide;

as halogen, chlorine, bromine and iodine.

Suitable examples of an activating agent are titanium tetrachloride, silicon tetrachloride, iodobutane, monochloroethane, hexachloroethane, chloromethylbenzene, carbon tetrachloride, ethylaluminium dichloride, iodine chloride and iodine. The best results have been obtained with titanium tetrachloride ($TiCl_4$). Hexachloroethane is also suitable.

The activating agent may be added to the liquid material at any time of the heat treatment, for example at the beginning; it may also be added throughout the heat treatment, especially when plateaus are maintained during the temperature rise, in particular during one of these plateaus.

When use is made of $TiCl_4$ as activating agent, this $TiCl_4$ may advantageously originate from an unreduced excess of the initial $TiCl_4$ from which the catalytic solids are prepared.

The quantity of activating agent used is expressed in relation to the quantity of titanium trichloride present in the liquid material. It is generally from approximately 0.1 to 20 moles of activating agent per mole of titanium trichloride, preferably from 0.5 to 10 moles per mole. The best results have been obtained when the activating agent is used in a proportion of 1 to 5 moles per mole of titanium trichloride.

It has been found advantageous to subject the solid particles based on complexed titanium trichloride resulting from the heat treatment of the liquid material described above to a maturing which is generally performed at the temperature reached at the end of the heat treatment, for a period which is generally from approximately 1 minute to 24 hours, preferably from 30 minutes to 5 hours.

The solid particles based on complexed titanium trichloride which are thus obtained are preferably separated from their preparation medium, for example by filtration, sedimentation or centrifuging, and are optionally washed with an inert hydrocarbon diluent of the same kind as those optionally employed for preparing the catalytic solid.

As mentioned above, when the operating conditions for the heat treatment of the liquid material have been adjusted for this purpose, these solid particles have a substantially spherical general shape, a narrow particle size distribution and a mean diameter of approximately 5 to 150 $\mu$m. Their titanium trichloride content is generally at least approximately 50% by weight, preferably at least 75%, and their content of electron-donor compound generally does not exceed approximately 15%, preferably 10%, relative to the total weight of the particles.

The porosity of the particles can be adjusted within a wide range through the choice of certain operating conditions for their preparation. It has thus been found that the increase in the content of groups Y of the composition (C) results in a modification of the porosity of the catalytic solid particles, and in particular in an increase in the internal porosity of these particles, produced by pores whose radius is from 1000 to 15,000 Å (called more simply IPV hereinafter). This process for manufacturing the catalytic solids therefore makes it possible to adjust their porosity, particularly the IPV, from values as low as approximately 0.02 $cm^3/g$ to values as high as approximately 0.4 $cm^3/g$.

It is also found that the increase in the quantity of composition (C) used results, with a higher yield, in catalytic solid particles of smaller dimensions and exhibiting a smaller pore volume being obtained.

The increase in the porosity of the catalysts within the region of pore radii in question results especially in propylene polymers of increasing porosity, which makes it possible to incorporate high and increasing quantities of elastomeric products therein without encountering problems of sticking.

Various variants can be introduced into the processes for preparing the catalytic solids based on complexed titanium trichloride and described above.

A first variant of embodiment (a) consists in adding to the medium for preparing the catalytic solid, preferably before the heat treatment of the liquid material, an organic or inorganic support (S) which has a porous texture such that the particles based on complexed titanium trichloride are deposited at its surface or precipitate within its pores. This addition may take place, for example, before the pretreated $TiCl_4$ is brought into contact with the composition (C).

To do this, supports (S) in which the pore volume is from approximately 0.1 $cm^3/g$ to 3.5 $cm^3/g$, preferably from 0.2 to 2.2 $cm^3/g$, are generally employed. The supports (S) generally consist of particles from approximately 5 $\mu$m to 350 $\mu$m in size, preferably from 10 to 200 $\mu$m.

Organic supports (S) which can be employed are, for example, preformed polymers. Inorganic supports (S) which can be employed are, for example, solids which are well known as catalyst supports, such as silicon, aluminium, magnesium, titanium and zirconium oxides and mixtures thereof. Among these inorganic supports (C) those preferably employed are solids based on alumina and silica and mixtures thereof.

The supports (S) employed in this variant of the process for preparing catalytic solids must generally be inert towards the reactants employed in the synthesis of the catalytic solids. To do this, it may be preferable to subject them, before they are used, to a heat treatment intended to remove all traces of residual moisture from them. The catalytic solids thus obtained have an appearance which is identical with that of the supports employed. Their porosity depends on the conditions of their preparation and on the nature of the support (S) introduced into the preparation medium.

The titanium trichloride content of the catalytic solids obtained using this variant is generally from approximately 7% to 60%, and the content of electron-donor compound is in most cases from approximately 1 to 10% by weight relative to the total weight of catalytic solid. This variant of the process for preparing the catalytic solids constitutes another means of adjusting their porosity.

A second variant of embodiment (b) consists in "prepolymerising" the catalytic solid particles based on complexed titanium trichloride. This "prepolymerisation" treatment consists in bringing the particles into contact with a lower alpha-monoolefin such as ethylene or, better, propylene, under polymerisation conditions which make it possible to obtain a solid generally containing from approximately 5 to approximately 500% by weight of "prepolymerised" alpha-monoolefin. This "prepolymerisation" can be advantageously performed on the particles resulting from the heat treatment of the liquid material in an optional inert hydrocarbon solvent as defined above, for a period which is sufficient to obtain the desired quantity of prepolymerised alpha-monoolefin on the solid.

This "prepolymerisation" is particularly advantageous when use is made of unsupported catalysts, to which it imparts a better mechanical strength.

A third variant of embodiment (c) consists in subjecting the catalytic solid particles based on complexed titanium trichloride to an additional activation treatment aimed at maintaining the stability of its properties. This additional activation treatment consists in bringing the catalytic solid particles into contact with an additional activating agent chosen from organoaluminium compounds and the products of the reaction of an organoaluminium compound with a hydroxyaromatic compound in which the hydroxyl group is sterically hindered. The organoaluminium compound is preferably chosen from trialkylaluminiums and alkylaluminium chlorides. The hydroxyaromatic compound is preferably chosen from di-tert-alkylated monocyclic monophenols and monoesters of 3-(3',5'-di-tert-butyl-4'-hydroxyphenyl)propionic acid such as n-octadecyl 3-(3',5'-di-tert-butyl-4'-hydroxyphenyl)propionate.

Some of the variants (a), (b) and (c) described above can also be combined, for example the solid catalytic particles may be subjected to the additional activation treatment simultaneously or consecutively with the "prepolymerisation" treatment described above.

Other details related to the additional activation treatment defined above, especially in relation to the nature of the organoaluminium and hydroxyaromatic compounds, and the operating conditions under which this treatment is performed, will be found in patents BE-A-803,875 (Solvay & Co), and EP-A-0,261,727 (Solvay & Co), the content of which is incorporated by reference in the present description.

Practical details relating to the process for obtaining the catalytic solid will be found in patent application EP-A-0,485,006, the content of which is incorporated by reference in the present description.

The second component of the catalyst systems of the invention is the cocatalyst, which comprises at least one compound chosen from nonhalogenated organoaluminium compounds, and preferably from nonhalogenated compounds and compositions of general formula $$AlR_rY_{3-r} \quad (VII)$$

in which
R denotes a hydrocarbon radical as defined above in relation to composition (C); this radical preferably contains from 1 to 18 carbon atoms; suitable nonhalogenated compounds of formula (VII) contain a radical R chosen from alkyl, aryl, arylalkyl, alkylaryl and cycloalkyl radicals, and R is preferably chosen from alkyl radicals containing from 2 to 6 carbon atoms;
Y denotes a group chosen from —OR', —SR' and —NR'R", in which each of R' and R" denotes a hydrocarbon radical or a hydrogen atom; when hydrocarbon radicals are involved, R' and R" may be chosen in the same way as the groups R' and R" in the formula (I) of the composition (C);
R is any number such that 0<r≦3.

The tri-n-alkylaluminiums of formula AlR₃ in which R is an alkyl radical generally containing from 2 to 6 carbon atoms make it possible to obtain advantageous results. Triethylaluminium and tri-n-butylaluminium are particularly preferred.

Alternatively, the cocatalysts may also be chosen from the oligomers of aluminoxane type which are in a cyclic and/or linear form, denoted by the general formulae (V) and (VI) defined above, in which R has the same meaning as in formula (VII) mentioned above.

Here, too, methyl-, ethyl- and butylaluminoxanes are suitable.

It is also possible to choose to make use of mixtures of a number of different cocatalysts corresponding to these definitions.

A second subject of the present invention relates to a process for gas phase polymerisation of olefins with terminal unsaturation containing from 2 to 18 carbon atoms, such as alpha-olefins like ethylene, propylene, butene, pentenes and hexenes, performed in the presence of a catalyst system according to the present invention.

It makes it possible to produce homopolymers, random copolymers and block copolymers.

The homopolymers are obtained by polymerisation of a single one of the olefinic monomers defined above.

Random copolymers are obtained by polymerisation of a mixture of two or more monomers chosen from the olefins defined above and diolefins containing from 4 to 18 carbon atoms.

Block copolymers consist of two or more separate blocks of different compositions, each block consisting of a homopolymer or a random copolymer as defined above. The blocks are polymerised sequentially. Before a given block (other than the first) is polymerised, it is optionally possible to remove, partially or completely, the monomer(s) which has (have) not reacted during the preceding stage.

The polymerisation process according to the present invention applies particularly well to the manufacture of propylene polymers, whether they be homopolymers or copolymers, containing at least approximately 50% by weight of propylene.

The polymerisation can be performed under conditions which are known per se: thus, the polymerisation temperature is generally chosen from approximately 20° to 200° C., preferably from 40° to 100° C., the best results being obtained from 50° to 95° C. The pressure is generally chosen from atmospheric pressure to 80 atmospheres and preferably from 10 to 50 atmospheres. The polymerisation may be performed continuously or noncontinuously.

The cocatalyst and the catalytic solid may be added to the polymerisation medium separately or simultaneously. They may also be brought into contact, for a period which may range from less than a second to several hours, at a temperature of approximately −40° C. to 80° C., before being introduced into the polymerisation reactor.

The total quantity of cocatalyst used is not critical; it is generally at least approximately 0.1 mmol per liter of reactor volume, preferably at least approximately 0.5 mmol per liter.

The quantities of cocatalyst and of catalytic solid which are used are generally chosen so that the molar ratio of the aluminium in the cocatalyst to the titanium in the catalytic solid (more simply denoted by "Al/Ti") is at least approximately 0.5, preferably at least approximately 1, particularly preferably at least 2; and so that this ratio is lower than approximately 100, preferably lower than approximately 50, particularly preferably lower than 25. As announced above, it has been found that the adjustment of this Al/Ti molar ratio makes it possible to continuously adjust the isotacticity index of the homopolymers: the lowest isotacticity indices correspond to the lowest values of the Al/Ti ratio. It is thus possible to adjust the isotacticity index from approximately 60% to approximately 87%.

While remaining qualitatively unimpaired, the influence of the Al/Ti ratio may naturally vary quantitatively as a function of the nature of the cocatalyst employed.

The morphology of the catalytic solid is important when attempts are made to obtain resins of low isotacticity or with a high content of sticky comonomer(s) while retaining good pourability.

The process as described above can be performed in the absence or in the presence of one or more agents for adjusting the molecular mass (transfer agents), such as hydrogen, diethylzinc, alcohols, ethers and alkyl halides; these agents make it possible to adjust the molecular mass of the polymers. In the absence of such agents, polymers of very high molecular masses are obtained with a very high activity.

A third subject of the present invention is the propylene polymers obtained by the polymerization processes according to the present invention.

These polymers can simultaneously exhibit a low rigidity and an excellent pourability, properties which were hitherto considered as contradictory in the case of propylene polymers.

The rigidity is assessed by measuring the flexural modulus according to ISO/DIS standards 178.2-91 on an injection-moulded test piece 3.2 mm in thickness. In the case of propylene polymers obtained by conventional processes, this flexural modulus is generally of the order of 1200 to 1500 MPa in the case of the homopolymers and of the order of 1100 to 1400 MPa in the case of propylene-ethylene block copolymers. In the case of the propylene polymers according to the present invention, on the other hand, the flexural modulus can reach values of approximately 600 to 800 MPa in the case of the homopolymers and go down to approximately 100 MPa in the case of propylene-ethylene block copolymers.

The pourability is measured by the time taken by 100 g of polymer to flow through a standardised 500-cm$^3$ funnel (wall inclination: 15°) (ASTM standard D-1895).

The polymerisation processes described above thus make it possible to obtain, in particular:

propylene homopolymers which have an isotacticity red measured by NMR) of at least approximately 60%, more particularly of at least approximately 65%; this isotacticity being generally lower than or equal to approximately 87% and preferably lower than or equal to approximately 85%; the pourability of these homopolymers being generally less than 1 s;

propylene block copolymers containing from approximately 10 to 70% by weight of random propylene-ethylene copolymer block(s) (preferably containing approximately 40 to 60% by weight of ethylene when good impact strength is aimed at), with a pourability of less than 1 s and a flexural modulus which is generally from approximately 100 to 600 MPa. The first block of these block copolymers may be especially a block of weakly isotactic propylene homopolymer (as described above) or of random polymer containing at least 90% of propylene;

random propylene-ethylene copolymers with a pourability of less than 1 s and an enthalpy of fusion of approximately 25 to 65 J/g, even when the propylene weight content of these copolymers exceeds 93%.

All the propylene polymer powders thus obtained exhibit excellent pourability (less than 1 s), reflecting a controlled morphology.

The molecular mass of the polymers can be adjusted by the addition of one or more agents for adjusting the molecular mass (transfer agents) to the polymerisation medium, such as hydrogen, diethylzinc, alcohols, ethers and alkyl halides.

In the absence of these agents propylene polymers of very high molecular masses are obtained, it being possible for the latter to easily exceed the value of $10^6$ g/mol, a value which is extremely high in the case of polypropylene polymers. The molecular mass distribution (Mw/Mn) (ratio of the weight- and number-averages of the molecular masses) can reach values of at least approximately eight and even of approximately 10 or even approximately 12, which represents a broader distribution than those obtained by conventional processes. The fact that the polymers thus obtained are weakly isotactic contributes to their processability remaining satisfactory despite their very high molecular mass.

The resins obtained from polymers according to the present invention exhibit high flexibility and resilience and good heat resistance. All the known plastics processing techniques, such as extrusion, injection moulding, blow moulding, compression moulding, calendering and the like can be applied to them.

These resins have a number of advantageous properties: among these it is possible to mention flexibility and resilience, which are obtained intrinsically, without it being necessary to add to them large quantities of plasticisers, as well as the sealability of the random copolymers, and the like. In the case of this latter point, as in the case of the thermomechanical processing in general, the low enthalpy of fusion of the resins of the invention constitutes a considerable advantage. Furthermore, the excellent internal and external morphology of the polymer powders makes them easier to handle and store and to treat with additives.

Insofar as the polymers of the present invention are concerned, these remarkable properties open the way to fields of application which hitherto appeared to remain inaccessible to propylene polymers and even to other resins. Among these applications there may be mentioned, no limitation being implied: flexible packaging, drawn and sealable films, units intended to absorb impacts, which may be entire components such as motor vehicle bumpers or trim applied, for example, to motor vehicle dashboards; sound-proofing units, electrical cable insulation, flexible piping of all kinds, medical or hygiene applications, in the case of which their barrier effect with regard to water and their discreteness when crumpled are particularly advantageous, and many more others.

The polymers of the present invention can also be incorporated into matrices made up of other resins to obtain two-phase or multiphase compositions. Relatively rigid polymeric matrices can thus be made stronger against impact.

With regard to the PPs of very high molecular mass referred to above, one of their main advantages is that, despite their very high molecular mass, their low rigidity nevertheless contributes to providing them with satisfactory processability.

It is also possible to choose to incorporate one or more conventional fillers into the polymers and compositions described above, for example inorganic materials such as calcium carbonate, fibrous reinforcements such as glass fibres, electrically conductive particles, pigments, and the like.

The invention is illustrated by the examples which follow. The meaning of the symbols employed in these examples, the units expressing the quantities mentioned and the methods for measuring these quantities are clarified below.

IPV=internal pore volume of the catalytic solid, read in the pore radius range from 1000 to 15,000 Å, expressed in cm$^3$/g.

Dm=mean diameter of the catalytic solid particles, in $\mu$m.

SPV=total pore volume of the support (S) expressed in cm$^3$/g.

Ss=specific surface of the catalytic solid, expressed in m$^2$/g and measured by the volumetric method of British Standard BS 4359/1 (1984).

Ssu=specific surface of the support (S), expressed in m$^2$/g, British Standard BS 4359/1 (1974).

CE=catalyst efficiency, conventionally expressed in grams of polymer insoluble in the polymerisation medium and obtained per gram of TiCl$_3$ contained in the catalytic solid. This quantity is assessed indirectly from the determination by X-ray fluorescence of the residual titanium content in the polymer.

AD=apparent density of the polymer, expressed in g/dm$^3$.

MFI=melt flow index, measured under a 2.16 kg load at 230° C. and expressed in g/10 min (ASTM standard D 1238).

G=torsional rigidity modulus of the polymer, measured at 23° C. and at a torsion angle of 60° of arc, the mould temperature being set at 70° C. and the conditioning period at 5 minutes [ASTM standard D 1043 (1984)]. This modulus is expressed in daN/cm$^2$.

Et=ethyl radical C$_2$H$_5$.

Isoamyl=isoamyl radical (CH$_3$)$_2$CH—CH$_2$—CH$_2$—

OIsoamyl=—OCH$_2$—CH$_2$—CH—(CH$_3$)$_2$ $C_{Cl}$, $C_{Ti}$, $C_{Al}$=chlorine, titanium and aluminium contents of the resin, respectively (in ppm)

I.I.=isotacticity index of the polymer, assessed by the molar fraction of isotactic triads (chain sequence of three propylene monomer units in meso configuration) in the total polymer. This value is determined by C-13 nuclear magnetic resonance as described in Macromolecules, volume 6, No. 6, page 925 (1973) and in references (3) to (9) in this publication.

Fl. mod.=flexural modulus measured according to ISO/DIS standards 178.2-91 on an injection-moulded test piece 3.2 mm in thickness.

$E_{(-20)}$=rupture energy at $-20°$ C., measured by the PTI test according to ISO standard 6603/2 with a 6.35 mm tup.

Transp.=transparency, measured according to ASTM standard D1746-70 on test pieces 2 mm in thickness.

The mean diameter of the catalytic solid particles is estimated by optical microscopic observation of this solid suspended in decalin (200 magnification).

The porosity of the catalysts and that of the polymers obtained in the polymerisation tests described below are measured by the mercury penetration method using porosimeters marketed by Carlo Erba Co., suitable for the pore radius range of between 75 and 75,000 Å.

The ethylene content of the block copolymers is obtained from the signals which are characteristic of these units, observed by C-13 nuclear magnetic resonance as described in Rubber Chemistry and Technology, volume 44 (1971), pages 781 et seq.

EXAMPLE 1

Preparation of the Catalytic Solid

1—Preparation of the composition (C)

800 ml of a dry mixture of aliphatic hydrocarbons boiling at 175° C. (marketed under the name Isopar H by Exxon Chemicals) and 170 ml of DEAC are introduced successively under nitrogen atmosphere into a 2-l reactor equipped with a single-bladed stirrer rotating at 400 rev/min. 82 ml of isoamyl alcohol are then introduced dropwise (over one hour) while the temperature of the solution is maintained below 50° C.

The solution is stored at room temperature, with stirring and under a stream of nitrogen, for 16 hours before being used. This composition can be characterised by the empirical formula:

AlEt$_{1.45}$(OIsoamyl)$_{0.55}$Cl.

2—Synthesis of the catalytic solid 1 l of Isopar H and 150 ml of TiCl$_4$ are introduced into a dry 5-l reactor equipped with a single-bladed stirrer rotating at 220 rev/min. While this solution of TiCl$_4$ is maintained at 30° C., 690 ml of diisoamyl ether (DIAE) are introduced slowly (30 minutes), followed by 970 ml of the composition (C) described above. The introduction of the composition (C) takes 60 minutes. After the stirring speed has been reduced to 85 rev/min, 450 ml of TiCl$_4$ are introduced over 20 minutes while the temperature is increased to reach 100° C. after 50 minutes. The suspension is kept at 100° C. for two hours and the solid formed is isolated by decantation and then washed with dry hexane. This catalytic solid, purplish-blue in colour, contains 830 g of TiCl$_3$ and 58 g of DIAE per kg. Its IPV is 0.07.

3—Prepolymerisation and preactivation of the catalytic solid

All the catalytic solid obtained according to point 2 (that is approximately 317 g of solid based on complexed TiCl$_3$) is suspended in 1.8 l of hexane at 30° C. with stirring at 150 rev/min.

The preactivation is carried out as follows. 780 ml of a hexane solution of a preactivator (called preactivator D hereinafter) prepared previously by mixing, per liter of hexane, 80 g of DEAC and 176 g of n-octadecyl 3-(3',5'-di-tert-butyl-4'-hydroxyphenyl)propionate marketed under the name Irganox 1076 by Ciba-Geigy are introduced slowly (over 30 minutes). This solution is used 15 minutes after the end of the gas release observed during its preparation.

After this addition, the prepolymerisation is carried out: 240 ml of propylene are introduced over 30 minutes and the suspension is kept stirred for a further 30 minutes. After decantation, the resulting prepolymerised catalytic solid is washed with dry hexane, the solid being resuspended, and is then dried by purging with nitrogen in a fluidised bed for 2 hours at 70° C.

The preactivated catalytic solid contains, per kg, 533 g of TiCl$_3$, 18 g of DIAE, 228 g of polypropylene and a quantity of preactivator D estimated at 142 g. The IPV of the catalyst is 0.09 cm$^3$/g and its specific surface is 8 m$^2$/g.

EXAMPLES 2 AND 3

Preparation of Supported Catalytic Solids

1—Preparation of the compositions (C)

30 ml of Isopar H and 5.7 ml of DEAC are introduced into a 100-ml round bottom flask conditioned under nitrogen beforehand. While this solution is kept stirred at 40° C., 1.2 ml of isoamyl alcohol are added to it dropwise over approximately thirty minutes. The solution thus obtained is kept stirred for 12 hours before being used.

2—Synthesis of the catalytic solids

The nature and the quantity of the supports (S) used in these syntheses, their characteristics and the heat treatments to which they are subjected beforehand are given in Table I below. 160 ml of Isopar H, 23 ml of diisoamyl ether and the chosen quantity (as given in Table I) of support (S) are introduced successively into a 1-liter autoclave equipped with a single-bladed stirrer rotating at 250 rev/min and purged with nitrogen before-hand. 20 ml of $TiCl_4$ are then added to this suspension over 30 minutes.

While this suspension is kept at 30° C., 35.7 ml of the composition (C) described above are added to it over an hour. The temperature is then increased to reach 100° C. after 1 h.

The reaction mixture is kept at this temperature for two hours and is then returned to room temperature. The liquid phase is then separated from the catalytic solid by decanting and the solid product is washed with hexane by successive decantations and then dried for 1 hour under a stream of nitrogen at 70° C.

The catalytic solid thus obtained has an appearance which is identical with that of the support; its colour is violet. Table I below also summarises the characteristics of the catalytic solids obtained.

TABLE I

| Examples | 2 | 3 |
|---|---|---|
| Characteristics of the supports (S) | | |
| type | Silica | Alumina-Corundum |
| trade name | SG 532 | SAEHS 33-50 |
| Company | Grace | Carborundum |
| SPV | 0.6 | 0.33 |
| Ssu | 320 | 3 |
| Heat treatment of the support (S) | | |
| Temperature (°C.) | 800 | 800 |
| time (h) | 16 | 16 |
| Quantity of support (S) used | 25 | 90 |
| Characteristics of the catalytic solids | | |
| $TiCl_3$ content (ppm) | 363 | 134 |
| DIAE content (ppm) | 89 | 16 |
| IPV | 0.01 | 0.10 |
| Ss | 243 | 33 |
| Dm | 20–200 | 10–150 |

EXAMPLES 4, 5, 6R AND 7 TO 13

Homopolymerisation of Propylene

To begin with, the catalytic solid is prepolymerised in liquid phase: to do this, the cocatalyst is introduced into a 5-l reactor equipped with a rotary stirrer and purged with nitrogen and the stirrer is set in motion (120 rev/min). The nitrogen is then purged, the reactor is degassed with propylene and 1 l of liquid propylene is introduced into it. Heating is then applied until the prepolymerisation temperature (approximately 50° C.) is reached: at this time the catalytic solid is introduced into the reactor and the prepolymerisation is allowed to take place for the desired period (10 minutes).

For the gas phase polymerisation itself, the temperature setting is adjusted to the polymerisation temperature ($T_1$), degassing is carried out to 10 bars and the stirrer speed is raised to 300 rev/min. Hydrogen is then added if necessary. Propylene is added, still at the temperature $T_1$, so as to reach the polymerisation pressure ($P_1$). The polymerisation then commences and is allowed to proceed for the desired period.

In tests 4 to 13 this operating method is used with different cocatalysts (TBA standing for tri-n-butylaluminium). Hydrogen is present only in test 12.

The catalytic solids employed are:

CAT1: deposited in corundum alumina, according to Example 3 above

CAT2: in bulk, prepared according to Example 1
CAT3: deposited on silica, according to Example 2
CAT4 and CAT5: these deposited catalytic solids are identical with catalytic solids CAT1 and CAT3 respectively, but have been further subjected to an additional prepolymerisation stage identical with that described in section 3 of Example 1 (without performing the preactivation).

The operating conditions are the following:

| Test | Cat. Type | solid (mg) | Cocatalyst Type | (mg) | $T_1$ (°C.) | Time (h) | Al/Ti | $P_1$ (bars) |
|---|---|---|---|---|---|---|---|---|
| 4 | CAT1 | 69.7 | TEAL | 153 | 70 | 3 | 3 | 25 |
| 5 | CAT1 | 59.8 | TEAL | 399 | 70 | 3 | 9 | 25 |
| 6R | CAT1 | 53.8 | DEAC | 400 | 70 | 3 | 10 | 25 |
| 7 | CAT2 | 50 | TEAL | 148 | 75 | 4 | 4 | 20 |
| 8 | CAT4 | 22 | TEAL | 48 | 75 | 3 | 2.9 | 20 |
| 9 | CAT5 | 34 | TEAL | 144 | 75 | 3 | 5.8 | 20 |
| 10 | CAT5 | 28.7 | TBA | 653 | 75 | 3 | 17.7 | 20 |
| 11 | CAT5 | 22.1 | TBA | 311 | 75 | 3 | 11.2 | 20 |
| 12 | CAT2 | 41 | TEAL | 178 | 80 | 4 | 5.8 | 25 |
| 13 | CAT2 | 18 | TEAL | 148 | 80 | 4 | 11.1 | 25 |

The characteristics of the products obtained are the following:

| Test | $C_{Cl}$ (ppm) | $C_{Ti}$ (ppm) | C.E. (g/g) | I.I. % | G (daN/cm$^2$) |
|---|---|---|---|---|---|
| 4 | 18 | 8.1 | 38,275 | 69 | <600 |
| 5 | 27.5 | 14 | 22,145 | 74 | 1380 |
| 6R | 260 | 79 | 3924 | 91 | 3000 |
| 10 | 50 | 22.5 | 13,780 | 75 | — |
| 11 | 40 | 18 | 17,224 | 74 | — |

In addition, in all these tests the pourability of the polymers obtained was lower than 1 s.

Tests 4 and 5 demonstrate the extremely high catalyst efficiency of the catalyst system, the low content of catalyst residues in the resins and the low isotacticity and rigidity which it makes it possible to attain; their comparison clearly shows the effect of the Al/Ti ratio on the isotacticity of the polymer. This effect is also found with TBA (tests 10 and 11), but with quantitative differences.

Tests 10 and 11, in which TBA was employed instead of TEAL as cocatalyst, resulted in homopolymers with an isotacticity (measured using NMR) of 75 and 74% respectively, that is substantially the same value as with TEAL in test 5.

In test 5 the enthalpy of fusion ($H_f$) of the homopolymer obtained was also measured: 74.2 J/g.

The comparative test with DEAC (6R) results in a very high content of catalyst residues, and especially of chlorine; with a low catalyst efficiency and with a very rigid and isotactic polymer.

The comparison of the results of tests 12, during which the molar content of $H_2$ is maintained at 0.5%, and 13 (without hydrogen) makes it possible to conclude that the presence of hydrogen reduces the molecular mass of the resins, as witness the measurements of MFI and intrinsic viscosity:

| Test | $C_{Ti}$ (ppm) | C.E. (g/g) | MFI | Visc. (l/g) | $H_2$ (%) |
|---|---|---|---|---|---|
| 12 | 28 | 11,072 | 2.3 | 0.246 | 0.5 |
| 13 | 17 | 18,237 | <0.1 | 0.618 | 0 |

The particle size (percentage of particles of diameter greater than 2 mm) of the products obtained in tests 7 to 9 was also measured:

| Test | AD (g/dm³) | $C_{Ti}$ (ppm) | C.E. (g/g) | Diameter >2 mm | Cat. solid |
|---|---|---|---|---|---|
| 7 | 313 | 13 | 23,848 | 2.6% | CAT2 |
| 8 | 407 | 11.5 | 26,960 | 71% | CAT4 |
| 9 | 405 | 11 | 28,184 | 45% | CAT5 |

It is found clearly that the choice of the catalytic solid, and in particular of its support, determines the AD as well as particle size, at comparable catalyst efficiency.

In these tests, too, the pourability was lower than 1 s each time.

EXAMPLES 14 AND 15

Polymerisation of Block Copolymers

The procedure is as described in the preceding tests for prepolymerising the catalytic solid and polymerising the first block.

The polymerisation of the first block is performed at $T_1=80°$ C., $P_1=25$ bars, for 3 h, with TEAL as cocatalyst and the catalytic solids indicated above. The consequence of these conditions is that they result in the formation of a first block with an isotacticity of 77%.

To polymerise the second block (propylene-ethylene random copolymer) degassing is performed to 2 kg/cm² at the polymerisation temperature $T_2$ and propylene is injected followed by ethylene in quantities such that they will result in a second block of the desired composition being obtained and will make it possible to reach the polymerisation pressure of the second block, $P_2$. The polymerisation of the second block then begins while the composition of the gas phase is maintained at the predefined values. It is allowed to proceed for the desired period.

In both cases the cocatalyst is TEAL and no hydrogen is employed.

The polymerisation of the second block is performed at a temperature $T_2=60°$ C. for a period of 2 hours. The second block thus obtained is a random polymer with an ethylene/propylene weight ratio of about 45/55. The following table gives details of the Al/Ti ratio, the polymerisation pressure of the second block ($P_2$), the propylene/(propylene+ethylene) molar ratio of the gas phase ($C_3/C_{tot}$), and the quantities of $TiCl_3$ and TEAL introduced.

| Test | Al/Ti | $P_2$ bars | $C_3/C_{tot}$ | $TiCl_3$ (mg) | TEAL (mg) | Catalytic solid |
|---|---|---|---|---|---|---|
| 14 | 5.5 | 10 | 0.7 | 20 | 80 | CAT5 |
| 15 | 5.1 | 17.5 | 0.69 | 15 | 57 | CAT4 |

The same characteristics as in the preceding examples were measured, together with the weight content of the ethylene copolymer ($C_2$), the flexural modulus (Fl. mod.) and the energy of rupture at -20° C. ($E_{(-20)}$):

| Test | AD (g/dm³) | $C_{Ti}$ (p.p.m.) | $C_{Cl}$ (p.p.m.) | C.E. (g/g) | $C_2$ (%) | Fl. mod. (MPa) | $E_{(-20)}$ (J) |
|---|---|---|---|---|---|---|---|
| 14 | 380 | 5.8 | 13 | 53,453 | 16.7 | 180 | 17 |
| 15 | 406 | 5.1 | 11.5 | 60,790 | 25.7 | 139 | 14.6 |

It is found that the block polymers are obtained with an extremely high catalyst efficiency, have a low rigidity and break in a ductile manner.

In addition, the pourability of the polymers thus obtained was lower than 1 s each time.

EXAMPLES 16 TO 18 AND 19R TO 21R

Polymerisation of Random Copolymers

In this case, too, the catalytic solid is prepolymerised in liquid phase to begin with. To do this, the cocatalyst is introduced into a 5-l reactor purged with nitrogen and fitted with a rotary stirrer, and stirring is started (120 rev/min). The nitrogen is then purged, the reactor is degassed with propylene and 1 liter of liquid propylene is introduced into it. Ethylene and hydrogen are then injected so as to obtain an ethylene-propylene-hydrogen gas mixture in such proportions that they will result in the synthesis of a copolymer of the desired composition. It is heated to the prepolymerisation temperature (approximately 50° C.), the proportions are readjusted if necessary and the catalytic solid is injected into the reactor and the prepolymerisation is allowed to take place for the desired period (10 minutes).

For the gas phase polymerisation itself, degassing is first of all carried out to 16 kg/cm² while heating to the test temperature ($T_1$) and the stirring speed is raised to 300 rev/min. Hydrogen, ethylene and propylene are then added in proportions such that they will result in the synthesis of a copolymer of the desired composition, until the intended total pressure is reached.

The catalytic solid employed in tests 16 to 18 and 19R to 21R is the catalytic solid CAT1. In each of the 6 tests the polymerisation takes place at 75° C., at 20 bars, for 4 hours, the composition of the gas phase being maintained at the predefined values. The cocatalyst is either TEAL (Examples 16 to 18) or, by way of comparison, DEAC (Examples 19R to 21R). The values shown in the following table were imposed on the ethylene ($C_{2g}$) and hydrogen ($H_2$) concentrations in the gas phase:

| Test | Al/Ti | $C_{2g}$ (molar %) | $H_2$ (molar %) | TEAL (mg) | DEAC (mg) | $TiCl_3$ (mg) |
|---|---|---|---|---|---|---|
| 16 | 3.2 | 1 | 0.3 | 52 | — | 22 |
| 17 | 3.2 | 3 | 0.2 | 39 | — | 16 |
| 18 | 2.8 | 3 | 0.1 | 37 | — | 18 |
| 19R | 9.3 | 1.5 | 3 | — | 466 | 64 |
| 20R | 19.6 | 1.5 | 3 | — | 644 | 42 |
| 21R | 13.4 | 3 | 3.5 | — | 589 | 56 |

The results are the following:

| Test | $C_{Al}$ (p.p.m.) | $C_{Ti}$ (p.p.m.) | $C_2$ (g/kg) | $T_m$ (°C.) | $H_f$ (J/g) | G | C.E. (g/g) |
|---|---|---|---|---|---|---|---|
| 16 | 170 | 12 | 15 | 150 | 56.8 | 755 | 26,045 |
| 17 | 80 | 6.4 | 39 | 140 | 36.9 | 345 | 48,514 |
| 18 | 50 | 4.5 | 40 | 133 | 29.4 | 210 | 68,998 |
| 19R | 530 | 41 | 40 | 140 | 67.2 | >1500 | 7572 |
| 20R | — | 26 | 40 | 139 | 67.6 | >1500 | 11,976 |
| 21R | 410 | 22 | 67 | 127 | 37.8 | 825 | 14,214 |

The high catalyst efficiency, the lowest contents of catalyst residues and the lowest enthalpies of fusion and rigidities are found to be obtained with TEAL (Examples 16, 17 and 18), when compared with the examples employing a chlorinated cocatalyst (Ex. 19R to 21R), with the same ethylene content.

In all these tests the pourability was lower than 1 s.

In addition, transparency measurements gave the following results:

| Test | Transp. (%) |
|---|---|
| 16 | 2.1 |
| 17 | 6.4 |
| 18 | 7.3 |
| 21R | 1 |

The conclusion is the clear superiority of the polymers obtained by a process employing a catalyst system according to the present invention.

We claim:

1. A propylene homopolymer having an isotacticity index within a range from 85% to 60% measured by $^{13}C$ NMR, a pourability of less than 1 s, an enthalpy of fusion from 60 to 80 J/g, and a flexural modulus from 600 to 800 MPa.

2. The propylene homopolymer according to claim 1, having a molecular mass higher than $10^6$ g/mol and an Mw/Mn ratio from 8 to 12.

3. In a composition, the improvement comprising a propylene homopolymer according to claim 1.

4. In a shaped object, the improvement comprising a composition according to claim 3.

5. A random copolymer of propylene and ethylene containing more than 93% by weight of propylene, having a pourability lower than 1 s and an enthalpy of fusion of 25 to 65 J/g.

6. A random copolymer according to claim 5, having a molecular mass higher than $10^6$ g/mol and an Mw/Mn ratio from approximately 8 to approximately 12.

7. In a composition, the improvement comprising a random copolymer according to claim 5.

8. In a shaped object, the improvement comprising a composition according to claim 7.

9. A random copolymer of propylene and ethylene containing from 1.5 to 4 weight % of ethylene, having a pourability lower than 1 s and an enthalpy of fusion of from 29 to 57 J/g.

10. The propylene homopolymer set forth in claim 1, wherein said isotacticity index is within a range from 74% to 69%.

11. The propylene homopolymer set forth in claim 1 obtained by gas phase polymerization by means of a catalyst system consisting essentially of a catalytic solid based on complexed $TiCl_3$ obtained by heat treatment, in the presence of a halogenated activating agent, of liquid material resulting from bringing $TiCl_4$, pretreated with an electron-donor compound, into contact with a composition (C) corresponding to the formula $AlR_p(Y)_qX_{3-(p+q)}$ in which:

R denotes a hydrocarbon radical,

Y denotes a group chosen from —OR', —SR' and —NR'R" in which each of R' and R" denotes a hydrocarbon radical or a hydrogen atom, X denotes a halogen, p is any number such that $0<p<3$, q is any number such that $0<q<3$, the sum p+q being such that $0<p+q\leq 3$ and a non-halogenated trialkylaluminium compound in which the alkyl contains from 2 to 6 carbon atoms.

12. The random copolymer of propylene and ethylene set forth in claim 5 obtained by a gas phase polymerization by means of a catalyst system consisting essentially of a catalytic solid based on complexed $TiCl_3$ obtained by heat treatment, in the presence of a halogenated activating agent, of liquid material resulting from bringing $TiCl_4$, pretreated with an electron-donor compound, into contact with a composition (C) corresponding to the formula $AlR_p(Y)_qX_{3-(p+q)}$ in which:

R denotes a hydrocarbon radical,

Y denotes a group chosen from —OR', —SR' and —NR'R" in which each of R' and R" denotes a hydrocarbon radical or a hydrogen atom, X denotes a halogen, p is any number such that $0<p<3$, q is any number such that $0<q<3$, the sum p+q being such that $0<p+q\leq 3$ and a non-halogenated trialkylaluminium compound in which the alkyl contains from 2 to 6 carbon atoms.

13. The random copolymer of propylene and ethylene set forth in claim 9 obtained by gas phase polymerization by means of a catalyst system consisting essentially of a catalytic solid based on complexed $TiCl_3$ obtained by heat treatment, in the presence of a halogenated activating agent, of liquid material resulting from bringing $TiCl_4$, pretreated with an electron-donor compound, into contact with a composition (C) corresponding to the formula $AlR_p(Y)_qX_{3-(p+q)}$ in which:

R denotes a hydrocarbon radical,

Y denotes a group chosen from —OR', —SR' and —NR'R" in which each of R' and R" denotes a hydrocarbon radical or a hydrogen atom, X denotes a halogen, p is any number such that $0<p<3$, q is any number such that $0<q<3$, the sum p+q being such that $0<p+q\leq 3$ and a non-halogenated trialkylaluminium compound in which the alkyl radicals contains from 2 to 6 carbon atoms.

* * * * *